May 23, 1950     A. L. HOLCOMB     2,509,061
ACCELERATION CLUTCH

Filed Jan. 30, 1948     2 Sheets-Sheet 1

INVENTOR
A. L. HOLCOMB
BY J. MacDonald
ATTORNEY

May 23, 1950        A. L. HOLCOMB        2,509,061
ACCELERATION CLUTCH

Filed Jan. 30, 1948        2 Sheets-Sheet 2

INVENTOR
A. L. HOLCOMB
BY J. MacDonald
ATTORNEY

Patented May 23, 1950

2,509,061

UNITED STATES PATENT OFFICE 2,509,061

ACCELERATION CLUTCH

Arthur L. Holcomb, Tarzana, Calif., assignor to Western Electric Company, Incorporated, New York, N. Y., a corporation of New York Application January 30, 1948, Serial No. 5,452

5 Claims. (Cl. 192—103)

This invention relates to clutches and more particularly to mechanical clutches designed to provide constant acceleration and deceleration independent of the load.

When distributors, and particularly those employed in the recording of sound, are driven by synchronous motors a difficult problem is encountered in providing a uniform rate of acceleration to the distributor shaft.

Various types of electrical circuits have been designed to overcome this difficulty but the results have been far from encouraging since the problem, in all such circuits, is that the final rate of acceleration is essentially the same just prior to reaching full speed. This rate is often of such a degree that the energy source in the motors, driven by the distributor, is sufficient to cause over-shooting and runaway when the drive motor suddenly arrives at synchronous speed.

When a combination of centrifugal clutch and fly-wheel is employed between the drive motor and distributor, the same condition exists but of course for a totally different reason. The centrifugal clutch, in its known forms, is difficult to operate so that it functions independent of the load applied since a clutch adjusted to be soft in performance with a light load will have a tendency to slip when operated with heavy loads or conversely when it is adjusted to operate with a heavy load it will accelerate a light load too sharply.

The clutch of this invention is designed to overcome the difficulties present in known clutches and provides a clutch structure which will have constant acceleration and deceleration independent of the load and contemplates a friction clutch mechanism, of the disc type, which is automatic in its action and which will transmit torque in either a clockwise or counter-clockwise direction and comprises a driving and a driven member. The driving member comprises a spider keyed to a drive shaft and having a plurality of friction elements mounted thereon by means of suitable studs. The driven member comprises a fly-wheel, freely mounted on the driven shaft and forming a housing for the discs which make up the friction elements of the clutch. The inner spider which supports the driven friction discs of the clutch, is keyed to the driven shaft and has mounted thereon automatically controllable fingers which exert pressure of varying degree on the friction discs to automatically engage and disengage the clutch elements, depending on the speed and amount of rotation.

The invention will be more clearly understood from the following detailed description when read in connection with the accompanying drawings of which:

Figure 1:
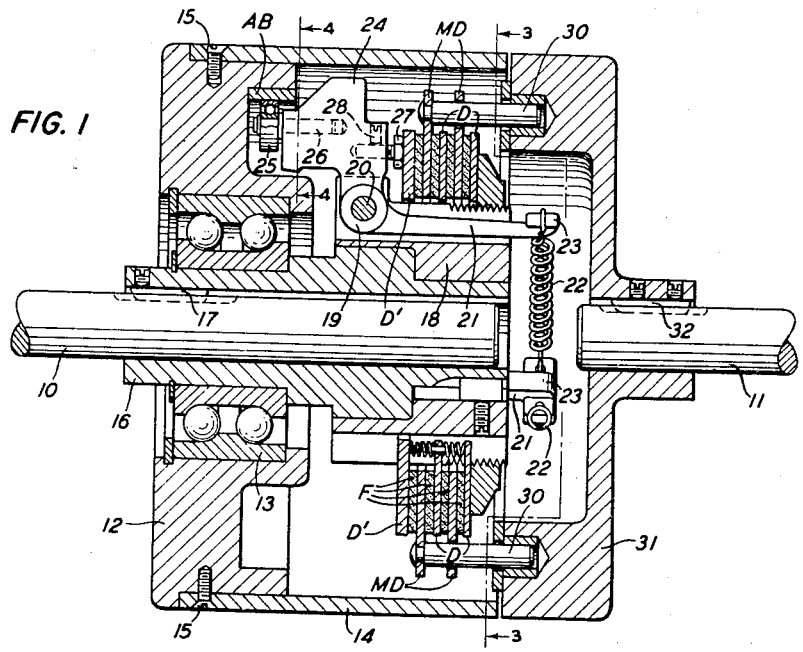
Fig. 1 is a side elevational view in section of the clutch of this invention with its driving and driven elements shown in engaged position.
Figure 2:
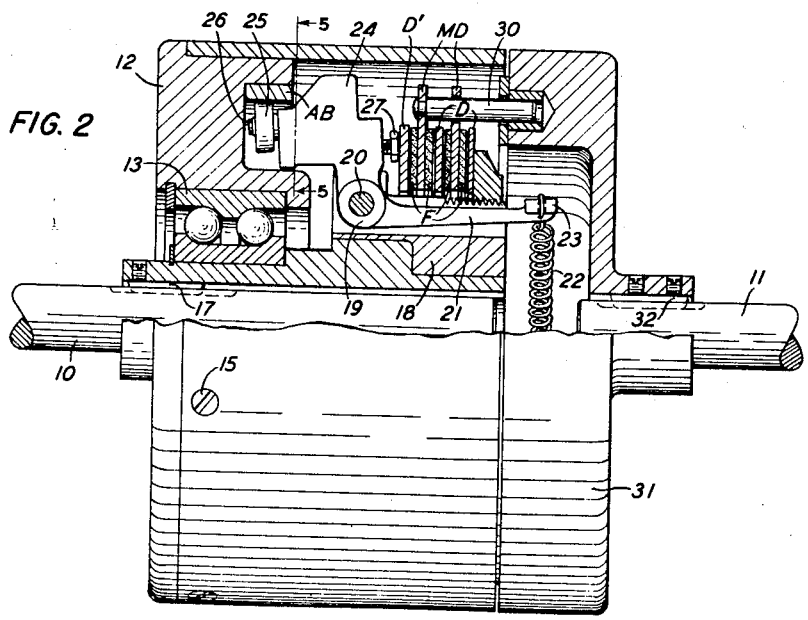
Fig. 2 is a side elevational view, partly in section, similar to Fig. 1 and showing the clutch with its driving and driven elements in disengaged position.
Figure 3:
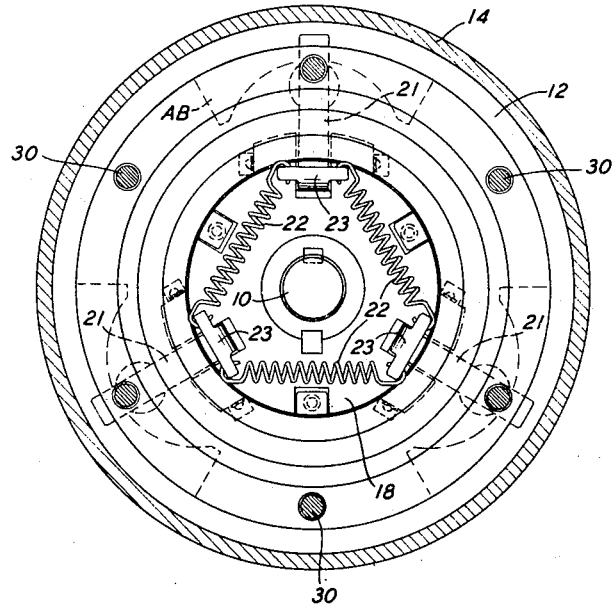
Fig. 3 is a cross-sectional view taken on line 3—3 of Fig. 1 and illustrates the springs for controlling the operation of the clutch fingers.

As shown in Figs. 1 and 2, I have shown a driven shaft 10 and a drive shaft 11, the driven shaft 10 may be connected to a device to be driven (not shown) and the drive shaft 11 to a suitable source of power. A fly-wheel 12 is mounted on the driven shaft 10 by means of a suitable ball bearing so that it is free to rotate with relation thereto. The fly-wheel 12, as shown, is provided with an encircling sleeve member 14 which is secured to the outer surface thereof by means of the screws 15; this provides a housing for the elements which make up the operating mechanism of the clutch which will hereinafter be described in detail. An inner hub member 16 is keyed to the shaft 10 at 17 and has fixedly secured thereto a spider 18 which has keyed thereon a plurality of discs D having fabric facings F thereon. Pivotally mounted on the spider 18 at the fulcrum points 19, by means of the pins 20, are the clutch fingers 21, as shown in Fig. 3. These fingers extend through the spider 18 and are joined together by means of the coil springs 22 which are secured to the outer or free ends 23 of the fingers 21. As shown in Fig. 3, the springs 22 may be readily removed and replaced by a set of springs having a different tension, thus varying the amount of force applied to the discs D', D and F of the clutch mechanism, through the clutch fingers 21.

Figure 4:
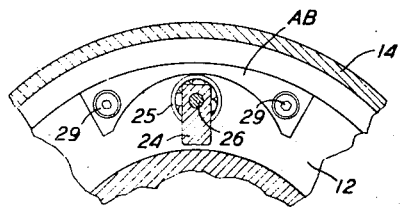
Fig. 4 is a fragmentary view, partly in section, taken on line 4—4 of Fig. 1 and illustrates the normal position of the rollers, which operate the clutch fingers.
Figure 5:
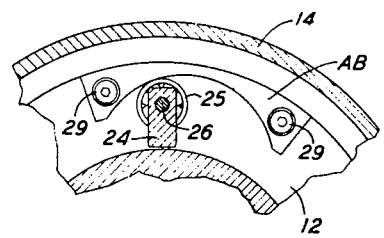
Fig. 5 is a view similar to Fig. 4, taken on line 5—5 of Fig. 2 and shows a roller in its operated position.

The clutch fingers 21 are provided with extending portions 24, which project beyond the fulcrum points 19, in the direction of the freely rotatable fly-wheel 12 and are provided on their ends with ball bearing rollers 25, which are free to rotate on the pins or axles 26. The inner ends of the extensions 24 are provided with adjustable projecting studs 27 which are in contact with the outer face of the clutch disc D' and are locked in place by means of the set screw 28. Mounted on the inner surface of the fly-wheel 12, by means of the screws 29 are the arcuate-shaped bosses AB which serve to confine the rollers 25 located on the extending portions 24 of the fingers 21 and when these rollers are centrally located in the arcuate portions of the bosses, as shown in Figs. 1, 3 and 4, the full tension of the springs 22 is applied to the discs D', D and MD through the medium of the clutch fingers 21. However, any rotation between the clutch mechanism and the fly-wheel tends to move the rollers 25 either to the right or to the left (Fig. 5 shows the roller 25 moved to the left) which causes the clutch fingers 21 to be depressed against the tension of the springs 22 and releases the pressure on the discs D', D and MD, thereby causing the clutch to be disengaged.

The friction element which is connected to the driving portion of the clutch mechanism and which forms part of the disc clutch structure, comprises the metal discs MD which are connected together by means of the studs 30, mounted on the spider 31 which in turn is keyed to the drive shaft 11 by means of the key 32. Thus when the clutch mechanism is aligned with respect to the free floating fly-wheel 12, as shown in Figs. 1 and 3, the full tension of the springs 22 is exerted on the clutch fingers 21 to produce friction between the friction discs D', D and MD of the clutch mechanism and the tension can be of such a degree so as to transmit any desired amount of power from the drive shaft 11 to the driven shaft 10.

It is therefore apparent that any acceleration of the driven shaft 10 will tend to displace the clutch fingers 21 with respect to the fly-wheel 12 since the inertia of the fly-wheel 12 tends to oppose sudden changes in motion. As the clutch fingers 21 depart from the reference point, with respect to the fly-wheel 12, they are depressed by the bosses 29, through the rollers 25, against the tension of the springs 22 and release the clutch in this process. However, the springs 22 act as a restoring force which tends to accelerate the fly-wheel 12 and restore the clutch fingers 21 back to their normal or central position as shown in Figs. 1 and 3. Thus the acceleration, which can be obtained from drive shaft 11 to the driven shaft 10 is a resultant of the inertia of the fly-wheel 12 and the restoring force of the springs 22 and it is not materially effected of the size or inertia of the load on the driven shaft 10.

As shown in Figs. 3 and 4, the action is symmetrical and thus is effective regardless of the direction of rotation and also regardless of whether the clutch is subjected to acceleration or deceleration.

A typical example of the operation of the clutch of my invention is as follows. The drive shaft 11, which is part of a variable reluctance synchronous motor, (not shown) accelerates to full speed in approximately one-half second. This sudden acceleration causes the clutch fingers 21 to be depressed by the fly-wheel 12 before the driven shaft 10 has been rotated far enough to seriously disturb the interlock motors connected to the distributor.

Having slipped the clutch discs D, D1' and MD, the rate of acceleration delivered to the driven shaft 10 is consequently limited. The restoring force of the springs 22, however, tends to accelerate the fly-wheel 12, which in turn increases the friction of the clutch and the force which can be transmitted to the driven shaft 10.

The automatic adjustment of the clutch, i. e. that of a departure from the reference point which in turn reduces the clutch friction which limits the torque that can be transmitted to the driven shaft 10, continues as a continuous process in which the inertia of the fly-wheel 12 and the friction of the clutch mechanism and the restoring forces of the springs 22 are all balanced against each other. Thus the rate of acceleration can be adjusted by changing the inertia of the fly-wheel 12 or the tension of the springs 22. However, I have found in practice, that a considerable latitude of adjustment exists by the use of the springs alone.

While I have shown and described the preferred embodiment of my invention, it is to be understood that various changes and modifications may be made therein without departing from the spirit of the invention and I am only limited by the scope of the appended claims.

What is claimed is:

1. A clutch mechanism comprising a driving shaft, means secured on said driving shaft and having a plurality of friction elements mounted thereon, a driven shaft in axial alignment with said driving shaft, a hub member fixedly mounted on said driven shaft, a spider secured on said hub, a plurality of friction elements slidably mounted thereon in juxtaposition with respect to said first friction elements, a member rotatably mounted on said hub, a plurality of bosses on said member, and means mounted on said spider in engagement with said bosses and said friction elements for causing the engagement and disengagement of the driving and driven shafts.

2. A clutch mechanism comprising a driving shaft, a disc member secured on said driving shaft, a plurality of pins extending inwardly from said disc member and having a plurality of friction elements mounted thereon, a driven shaft in axial alignment with said driving shaft, a hub member fixedly mounted on said driven shaft, a spider secured on said hub, a plurality of friction elements slidably mounted thereon in juxtaposition with respect to said first friction elements, a member rotatably mounted on said hub, a plurality of bosses on said member and means mounted on said spider in engagement with said bosses and said friction elements for causing the engagement and disengagement of the driving and driven shafts.

3. A clutch mechanism comprising a driving shaft, means secured on said driving shaft and having a plurality of friction elements mounted thereon, a driven shaft in axial alignment with said driving shaft, a hub member fixedly mounted on said driven shaft, a spider secured on said hub, a plurality of friction elements slidably mounted thereon in juxtaposition with respect to said first friction elements, a fly-wheel rotatably mounted on said hub, a plurality of arcuate bosses on the inner surface of said fly-wheel, and means mounted on said spider in engagement with said bosses and said friction elements for causing the engagement and disengagement of the driving and driven shafts.

4. A clutch mechanism comprising a driving shaft, means secured on said driving shaft and having a plurality of friction elements mounted thereon, a driven shaft in axial alignment with said driving shaft, a hub member fixedly mounted on said driven shaft, a spider secured on said hub, a plurality of friction elements slidably mounted thereon in juxtaposition with respect to said first friction elements, a member rotatably mounted on said hub, a plurality of bosses on said member, and a plurality of arms pivotally mounted on said spider, the inner ends of said arms in engagement with said bosses and the outer ends in engagement with said friction elements for causing the engagement and disengagement of the driving and driven shafts.

5. A clutch mechanism comprising a driving shaft, means secured on said driving shaft and having a plurality of friction elements mounted thereon, a driven shaft in axial alignment with said driving shaft, a hub member fixedly mounted on said driven shaft, a spider secured on said hub, a plurality of friction elements slidably mounted thereon in juxtaposition with respect to said first friction elements, a member rotatably mounted on said hub, a plurality of bosses on said member, means mounted on said spider in engagement with said bosses and said friction elements for causing the engagement and disengagement of the driving and driven shafts, and means on said arms for maintaining the inner ends thereof in contact with said bosses.

ARTHUR L. HOLCOMB.

REFERENCES CITED

The following references are of record in the file of this patent:

UNITED STATES PATENTS

| Number | Name | Date |
|---|---|---|
| 1,973,199 | Conway | Sept. 11, 1934 |
| 2,079,678 | Chilton | May 11, 1937 |
| 2,400,585 | Wolff | May 21, 1946 |